(12) United States Patent
Hoshi et al.

(10) Patent No.: US 6,235,847 B1
(45) Date of Patent: May 22, 2001

(54) LINEAR BLOCK COPOLYMER AND RESIN COMPOSITION CONTAINING THE SAME

(75) Inventors: Susumu Hoshi, Yokohama; Yukio Yamaura, Iwatsuki, both of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/486,989

(22) PCT Filed: Aug. 3, 1999

(86) PCT No.: PCT/JP99/04159

§ 371 Date: Mar. 6, 2000

§ 102(e) Date: Mar. 6, 2000

(87) PCT Pub. No.: WO00/08079

PCT Pub. Date: Feb. 17, 2000

(30) Foreign Application Priority Data

Aug. 3, 1998 (JP) .................................................. 10-218822

(51) Int. Cl.[7] .................................................. C08F 297/04
(52) U.S. Cl. .................................. 525/314; 525/98; 525/99
(58) Field of Search ................................ 525/314, 98, 99

(56) References Cited

U.S. PATENT DOCUMENTS

| | | |
|---|---|---|
| 4,122,134 | 10/1978 | Miki et al. . |
| 4,167,545 | 9/1979 | Fahrbach et al. . |
| 4,939,208 | 7/1990 | Lanza et al. . |
| 5,227,419 | 7/1993 | Moczygemba et al. . |
| 5,510,423 * | 4/1996 | Van Dijk et al. .................... 525/314 |

FOREIGN PATENT DOCUMENTS

| | | |
|---|---|---|
| 7-97418 | 4/1995 | (JP) . |
| 11-255851 | 9/1999 | (JP) . |

\* cited by examiner

*Primary Examiner*—James J. Seidleck
*Assistant Examiner*—Olga Asinovsky
(74) *Attorney, Agent, or Firm*—Birch, Stewart, Kolasch & Birch, LLP

(57) ABSTRACT

Disclosed is a linear block copolymer comprising at least two vinyl aromatic hydrocarbon polymer blocks (S), at least two conjugated diene polymer blocks (B) and at least one vinyl aromatic hydrocarbon/conjugated diene copolymer block (B/S); the linear block copolymer having a specific block configuration wherein both terminal polymer blocks of the linear block copolymer are S blocks, both terminal S blocks have, bonded directly to the respective inner ends thereof, B blocks, and the B blocks, which are bonded directly to the respective inner ends of both terminal polymer blocks (S), have therebetween one or two B/S blocks which is or are bonded directly to the respective inner ends of the polymer blocks (B); the linear block copolymer comprising at least two fractions having different peak molecular weights, and both terminal S blocks in total comprising at least two fractions having different peak molecular weights. Also disclosed is a resin composition comprising the linear block copolymer and a styrene-containing resin in a specific amount ratio.

7 Claims, No Drawings

LINEAR BLOCK COPOLYMER AND RESIN COMPOSITION CONTAINING THE SAME

This application is the national phase under 35 U.S.C. § 371 of PCT International Application No. PCT/JP99/04159 which has an International filing date of Aug. 3, 1999, which designated the United States of America.

BACKGROUND OF THE INVENTION

1. Field of the Invention

The present invention relates to a linear block copolymer. More particularly, the present invention is concerned with a linear block copolymer comprising at least two vinyl aromatic hydrocarbon polymer blocks (S), at least two conjugated diene polymer blocks (B) and at least one vinyl aromatic hydrocarbon/conjugated diene copolymer block (B/S); the linear block copolymer having a specific block configuration wherein both terminal polymer blocks of the linear block copolymer are S blocks, both terminal S blocks have, bonded directly to the respective inner ends thereof, B blocks, and the B blocks, which are bonded directly to the respective inner ends of both terminal polymer blocks (S), have therebetween one or two B/S blocks which is or are bonded directly to the respective inner ends of the polymer blocks (B); the linear block copolymer comprising at least two fractions having different peak molecular weights, and both terminal S blocks in total comprising at least two fractions having different peak molecular weights. The present invention is also concerned with a resin composition comprising the linear block copolymer and a styrene-containing resin in a specific amount ratio. By molding the linear block copolymer of the present invention or the resin composition containing the linear block copolymer, a shaped article retaining high transparency and having excellent rigidity and excellent impact resistance can be obtained.

2. Prior Art

A block copolymer comprising a vinyl aromatic hydrocarbon and a conjugated diene wherein the vinyl aromatic hydrocarbon content is relatively high, has various excellent characteristics, such as transparency and impact resistance, so that such a block copolymer is used for producing injection-molded products, extrusion-molded products (such as a sheet and a film) and the like. Conventionally, in an attempt to improve the mechanical properties (such as impact resistance) of a shaped article produced from a block copolymer while retaining the transparency of the shaped article, there have been proposed not only block copolymers comprising a vinyl aromatic hydrocarbon and a conjugated diene and methods for producing such block copolymers, but also resin compositions comprising such block copolymers. For example, in an attempt to improve the transparency and impact resistance of a block copolymer, Unexamined Japanese Patent Application Laid-Open Specification No. 52-58788 (corresponding to U.S. Pat. No. 4,167,545) discloses a branched block copolymer obtained by division-wise adding a catalyst to a block copolymerization system. Also, for improving the environmental stress cracking resistance of a block copolymer, Unexamined Japanese Patent Application Laid-Open Specification No. 4-277509 (corresponding to U.S. Pat. No. 5,227,419 and European Patent No. 492490) discloses a method for producing a block copolymer having gradually varied properties, which comprises division-wise adding a catalyst to a block copolymerization system. On the other hand, for obtaining a block copolymer having transparency and mechanical properties, Unexamined Japanese Patent Application Laid-Open Specification No. 63-145314 (corresponding to U.S. Pat. No. 4,939,208 and European Patent No. 270515) discloses a method for producing a block copolymer having an $S_1$-$B_1$-B/S-$S_2$ block configuration, wherein $S_1$ and $S_2$ each represent an aromatic vinyl uniform polymer block, $B_1$ represents a conjugated diene uniform polymer block, and B/S represents a random copolymer block. Further, with a view to improving the transparency and impact resistance of a block copolymer, Unexamined Japanese Patent Application Laid-Open Specification No. 7-97418 discloses a block copolymer which has characteristic features with respect to the vinyl aromatic hydrocarbon block ratio, the arrangement of the polymer blocks, the ratio of the conjugated diene in a segment in which a vinyl aromatic hydrocarbon and a conjugated diene are randomly copolymerized, and the like. However, the above-mentioned conventional block copolymers have problems in that when such a block copolymer is formulated into a resin composition thereof with a styrene-containing resin and molded to obtain a sheet, followed by processing to produce a shaped article, such as a cup for beverage or a cup for frozen or cold dessert, the shaped article has an unsatisfactory balance of transparency, impact resistance, rigidity and the like. Accordingly, it has been desired to produce a block copolymer which is improved so that it is capable of producing therefrom a shaped article having excellent transparency, impact resistance, rigidity and the like.

SUMMARY OF THE INVENTION

In this situation, the present inventors have made extensive and intensive studies with a view to solving the above-mentioned problems accompanying the prior art block copolymer. As a result, it has surprisingly been found that when a specific linear block copolymer is subjected to processing to obtain a shaped article, the article exhibits a good balance of transparency, rigidity and impact resistance, wherein the linear block copolymer comprises at least two vinyl aromatic hydrocarbon polymer blocks (S), at least two conjugated diene polymer blocks (B) and at least one vinyl aromatic hydrocarbon/conjugated diene copolymer block (B/S); the linear block copolymer having a specific block configuration wherein both terminal polymer blocks of the linear block copolymer are S blocks, both terminal S blocks have, bonded directly to the respective inner ends thereof, B blocks, and the B blocks, which are bonded directly to the respective inner ends of both terminal polymer blocks (S), have therebetween one or two B/S blocks which is or are bonded directly to the respective inner ends of the polymer blocks (B); the linear block copolymer comprising at least two fractions having different peak molecular weights, and both terminal S blocks in total comprising at least two fractions having different peak molecular weights. Based on this finding, the present invention has been completed.

Accordingly, it is a primary object of the present invention to provide a novel linear block copolymer having excellent transparency, impact resistance and rigidity.

It is another object of the present invention to provide a resin composition comprising the above-mentioned linear block copolymer and a styrene-containing resin, which has excellent transparency, impact resistance and rigidity.

The foregoing and other objects, features and advantages of the present invention will be apparent from the following detailed description and appended claims.

DETAILED DESCRIPTION OF THE INVENTION

In a primary aspect of the present invention, there is provided a linear block copolymer comprising:

at least two vinyl aromatic hydrocarbon polymer blocks (S);

at least two conjugated diene polymer blocks (B); and at least one vinyl aromatic hydrocarbon/conjugated diene copolymer block (B/S), the total amount of vinyl aromatic hydrocarbon monomer units in the linear block copolymer and the total amount of conjugated diene monomer units in the linear block copolymer being, respectively, from 65 to 90% by weight and from 35 to 10% by weight, based on the weight of the linear block copolymer, the linear block copolymer having a block configuration wherein:

both terminal polymer blocks of the linear block copolymer are vinyl aromatic hydrocarbon polymer blocks (S), both terminal vinyl aromatic hydrocarbon polymer blocks (S) have, bonded directly to the respective inner ends thereof, conjugated diene polymer blocks (B), and the conjugated diene polymer blocks (B), which are bonded directly to the respective inner ends of both terminal vinyl hydrocarbon polymer blocks (S), have therebetween one or two vinyl aromatic hydrocarbon/conjugated diene copolymer blocks (B/S) which is or are bonded directly to the respective inner ends of the conjugated diene polymer blocks (B), wherein, when the polymer blocks (B) have therebetween two vinyl aromatic hydrocarbon/conjugated diene copolymer blocks (B/S), the two copolymer blocks (B/S) have therebetween at least one polymer block selected from the group consisting of the polymer blocks (S), (B) and (B/S) in a contiguous relationship, the linear block copolymer comprising at least two different fractions ($\alpha$) and ($\beta$), wherein the fraction ($\alpha$) has at least one peak molecular weight in the range of from 50,000 to 150,000 in a first chromatogram taken by gel permeation chromatography (GPC) with respect to the linear block copolymer, and the fraction ($\beta$) has at least one peak molecular weight in the range of from more than 150,000 to 350,000 in the first chromatogram, both terminal vinyl aromatic hydrocarbon polymer blocks (S) in total comprising a fraction having at least one peak molecular weight in the range of from 10,000 to 60,000 in a second chromatogram taken by GPC with respect to both terminal vinyl aromatic hydrocarbon polymer blocks (S), and a fraction having at least one peak molecular weight in the range of from 120,000 to 250,000 in the second chromatogram, the linear block copolymer having a weight average molecular weight of from 50,000 to 500,000.

In another aspect of the present invention, there is provided a resin composition comprising 100 parts by weight of the above-mentioned linear block copolymer and 30 to 400 parts by weight of a styrene-containing resin.

For easy understanding of the present invention, the essential features and various embodiments of the present invention are enumerated below.

1. A linear block copolymer comprising:

at least two vinyl aromatic hydrocarbon polymer blocks (S);

at least two conjugated diene polymer blocks (B); and at least one vinyl aromatic hydrocarbon/conjugated diene copolymer block (B/S), the total amount of vinyl aromatic hydrocarbon monomer units in the linear block copolymer and the total amount of conjugated diene monomer units in the linear block copolymer being, respectively, from 65 to 90% by weight and from 35 to 10% by weight, based on the weight of the linear block copolymer, the linear block copolymer having a block configuration wherein:

both terminal polymer blocks of the linear block copolymer are vinyl aromatic hydrocarbon polymer blocks (S), both terminal vinyl aromatic hydrocarbon polymer blocks (S) have, bonded directly to the respective inner ends thereof, conjugated diene polymer blocks (B), and the conjugated diene polymer blocks (B), which are bonded directly to the respective inner ends of both terminal vinyl hydrocarbon polymer blocks (S), have therebetween one or two vinyl aromatic hydrocarbon/conjugated diene copolymer blocks (B/S) which is or are bonded directly to the respective inner ends of the conjugated diene polymer blocks (B), wherein, when the polymer blocks (B) have therebetween two vinyl aromatic hydrocarbon/conjugated diene copolymer blocks (B/S), the two copolymer blocks (B/S) have therebetween at least one polymer block selected from the group consisting of the polymer blocks (S), (B) and (B/S) in a contiguous relationship, the linear block copolymer comprising at least two different fractions ($\alpha$) and ($\beta$), wherein the fraction ($\alpha$) has at least one peak molecular weight in the range of from 50,000 to 150,000 in a first chromatogram taken by gel permeation chromatography (GPC) with respect to the linear block copolymer, and the fraction ($\beta$) has at least one peak molecular weight in the range of from more than 150,000 to 350,000 in the first chromatogram, both terminal vinyl aromatic hydrocarbon polymer blocks (S) in total comprising a fraction having at least one peak molecular weight in the range of from 10,000 to 60,000 in a second chromatogram taken by GPC with respect to both terminal vinyl aromatic hydrocarbon polymer blocks (S), and a fraction having at least one peak molecular weight in the range of from 120,000 to 250,000 in the second chromatogram, the linear block copolymer having a weight average molecular weight of from 50,000 to 500,000.

2. The block copolymer according to item 1 above, which has a block configuration represented by the following formula (1):

$$S\text{-}(B\text{-}B/S)_n\text{-}B\text{-}S \tag{1}$$

wherein each S independently represents the vinyl aromatic hydrocarbon polymer block;

each B independently represents the conjugated diene polymer block;

the or each B/S represents the vinyl aromatic hydrocarbon/conjugated diene copolymer block; and n represents an integer of from 1 to 5.

3. The block copolymer according to item 1 or 2 above, wherein both terminal vinyl aromatic hydrocarbon polymer blocks (S) in total comprise a fraction having at least one peak molecular weight in the range of from 10,000 to 50,000 in the second chromatogram, and a fraction having at least one peak molecular weight in the range of from 150,000 to 250,000 in the second chromatogram.

4. The block copolymer according to any one of items 1 to 3 above, which has a vinyl aromatic hydrocarbon polymer block ratio of from 60 to 95% by weight, wherein the block ratio is defined as the percent by weight of the vinyl aromatic hydrocarbon monomer units contained in the polymer blocks (S), based on the total weight of vinyl aromatic hydrocarbon monomer units contained in the linear block copolymer.

5. The block copolymer according to any one of items 1 to 4 above, wherein the fraction (α) has at least one peak molecular weight in the range of from 50,000 to 120,000 in the first chromatogram, and the fraction (β) has at least one peak molecular weight in the range of from 160,000 to 300,000 in the first chromatogram.

6. The block copolymer according to any one of items 1 to 5 above, wherein the content of the fraction (α) in the linear block copolymer and the content of the fraction (β) in the linear block copolymer are from 30 to 70% by weight and from 70 to 30% by weight, respectively.

7. A resin composition comprising 100 parts by weight of the linear block copolymer of any one of items 1 to 6 above and 30 to 400 parts by weight of a styrene-containing resin.

Hereinbelow, the present invention is described in detail.

The linear block copolymer of the present invention comprises at least two vinyl aromatic hydrocarbon polymer blocks (S), at least two conjugated diene polymer blocks (B), and at least one vinyl aromatic hydrocarbon/conjugated diene copolymer block (B/S). In the linear block copolymer of the present invention, each of the at least two vinyl aromatic hydrocarbon polymer blocks (S) generally comprises a plurality of vinyl aromatic hydrocarbon monomer units. Both terminal polymer blocks of the linear block copolymer, that is, two vinyl aromatic hydrocarbon polymer blocks (S), are different from each other; however, when the linear block copolymer contains three or more vinyl aromatic hydrocarbon polymer blocks (S), some of these vinyl aromatic hydrocarbon polymer blocks (S) may be identical. Each of the at least two conjugated diene polymer blocks (B) generally comprises a plurality of conjugated diene monomer units. These conjugated diene polymer blocks (B) may be identical or different. The at least one vinyl aromatic hydrocarbon/conjugated diene copolymer block generally comprises vinyl aromatic hydrocarbon monomer units and conjugated diene monomer units. When the linear block copolymer contains a plurality of copolymer blocks (B/S), these copolymer blocks (B/S) may be identical or different. It is possible that, in the course of the polymerization for producing the linear block copolymer, a very small amount of vinyl aromatic hydrocarbon monomer units gets mixed into conjugated diene monomer units in polymer block (B), and a very small amount of conjugated diene monomer units gets mixed into vinyl aromatic hydrocarbon monomer units in polymer block (S).

As mentioned above, in the linear block copolymer of the present invention, both terminal polymer blocks are vinyl aromatic hydrocarbon polymer blocks (S). Both terminal vinyl aromatic hydrocarbon polymer blocks (S) have, bonded directly to the respective inner ends thereof, conjugated diene polymer blocks (B). These conjugated diene polymer blocks (B) have therebetween one or two vinyl aromatic hydrocarbon/conjugated diene copolymer blocks (B/S) which is or are bonded directly to the respective inner ends of the conjugated diene polymer blocks, wherein, when the polymer blocks (B) have therebetween two vinyl aromatic hydrocarbon/conjugated diene copolymer blocks (B/S), the two copolymer blocks (B/S) have therebetween at least one polymer block selected from the group consisting of the polymer blocks (S), (B) and (B/S) in a contiguous relationship. It is required that the linear block copolymer of the present invention have the above-mentioned block configuration.

Further, it is preferred that the linear block copolymer of the present invention has a block configuration represented by the following formula (1):

S-(B-B/S)$_n$-B-S    (1)

wherein each S independently represents the vinyl aromatic hydrocarbon polymer block;

each B independently represents the conjugated diene polymer block;

the or each B/S represents the vinyl aromatic hydrocarbon/conjugated diene copolymer block; and n represents an integer of from 1 to 5.

Examples of linear block copolymers having the above-mentioned block configuration of formula (1) include block copolymers respectively having block configurations represented by the following formulae:

S$_1$-B$_1$-B/S-B$_2$-S$_2$, and

S$_1$-B$_1$-B/S-B$_3$-B/S-B$_2$-S$_2$, wherein the suffixes attached to the symbols "S" and "B" respectively represent the block identification numbers of vinyl aromatic hydrocarbon polymer blocks (S) and conjugated diene polymer blocks (B) in the linear block copolymer.

As described below, the linear block copolymers having the above-mentioned block configurations can be obtained by polymerizing a vinyl aromatic hydrocarbon monomer and a conjugated diene monomer in a hydrocarbon solvent in the presence of an organolithium compound used as a polymerization initiator under appropriate conditions.

The linear block copolymer of the present invention comprises at least two different fractions (α) and (β), wherein the fraction (α) has at least one peak molecular weight in the range of from 50,000 to 150,000, preferably from 50,000 to 120,000, in a first chromatogram taken by gel permeation chromatography (GPC) with respect to the linear block copolymer, and the fraction (β) has at least one peak molecular weight in the range of from more than 150,000 to 350,000, preferably from 160,000 to 300,000, in the first chromatogram. When the peak molecular weight of the fraction (α) is less than 50,000 or more than 150,000, or when the peak molecular weight of the fraction (β) is less than 150,000 or more than 350,000, the impact resistance of the linear block copolymer is disadvantageously lowered.

In the present invention, it is preferred that the content of the fraction (α) in the linear block copolymer is from 30 to 70% by weight, more advantageously from 35 to 65% by weight. In the present invention, it is also preferred that the content of the fraction (β) in the linear block copolymer is from 70 to 30% by weight, more advantageously from 65 to 35% by weight.

As examples of methods for producing a linear block copolymer comprising such a plurality of fractions having different peak molecular weights, namely, a linear block copolymer having a bimodal or a multimodal molecular weight distribution, there can be mentioned the following two methods. One method consists in that, in the course of the polymerization reaction of the vinyl aromatic hydrocarbon monomers for forming the terminal blocks of molecular chains on the polymerization initiation side, the polymerization initiator and the vinyl aromatic hydrocarbon monomers are further added to the polymerization reaction system to generate fresh polymerization initiating points for forming fresh additional molecular chains of linear block copolymer, thereby producing a plurality of fractions having different peak molecular weights. The other method consists in that, in the course of the polymerization reaction of the vinyl aromatic hydrocarbon monomers for forming the terminal blocks of molecular chains on the polymerization termination side, a deactivating agent, such as an alcohol or water, is added to the polymerization reaction system to deactivate a part of the polymerization initiator, thereby terminating the polymerization reaction of a part of molecular chains, and then the vinyl aromatic hydrocarbon monomers are again added to the polymerization reaction system to continue the polymerization reaction of the remaining part of molecular chains for forming fresh additional terminal blocks of linear block copolymer on the polymerization termination side, thereby producing a plurality of fractions having different peak molecular weights. These methods can be employed individually or in combination. By these methods, fractions having different peak molecular weights can be obtained in a single reaction system. Such a linear block copolymer having fractions having different peak molecular weights can alternatively be obtained by mixing together linear block copolymers having different peak molecular weights which have been separately prepared. The thus obtained linear block copolymer comprises fraction ($\alpha$) having a low content of vinyl aromatic hydrocarbon monomer units and fraction ($\beta$) having a high content of vinyl aromatic hydrocarbon monomer units. Elucidation has not been made as to the reason why the linear block copolymer of the present invention, which has a good balance of transparency, rigidity and impact resistance, can be obtained by the bimodalization or multimodalization of the molecular weight distribution of a linear block copolymer comprising a vinyl aromatic hydrocarbon and a conjugated diene and having a relatively high vinyl aromatic hydrocarbon content. However, it is considered that the coexistence, in the linear block copolymer, of the elastomeric fraction ($\alpha$), which has a low content of vinyl aromatic hydrocarbon monomer units, and the resinous fraction ($\beta$), which has a high content of vinyl aromatic hydrocarbon monomer units, enables such a block copolymer to exhibit excellent mechanical properties, while retaining the transparency which is inherent in this type of block copolymer comprising vinyl aromatic hydrocarbon polymer blocks and conjugated diene polymer blocks.

In the present invention, the peak molecular weight of the linear block copolymer can be determined by GPC. Specifically, the peak molecular weight of the linear block copolymer can be determined by a method which comprises subjecting the linear block copolymer to GPC to obtain a GPC chromatogram (first chromatogram) of the linear block copolymer, and determining the peak molecular weight of the linear block copolymer by the conventional method using a calibration curve obtained from GPC chromatograms showing the peak molecular weights of monodisperse polystyrene samples (see, for example, Gel Permeation Chromatography, pp. 81–85, 1976, published by Maruzen Co., Ltd., Japan). The content of each of the fractions in the linear block copolymer can be calculated from the ratio of the area of each of the peaks in the GPC chromatogram of the linear block copolymer.

With respect to the linear block copolymer of the present invention, both terminal vinyl aromatic hydrocarbon polymer blocks (S) in total comprise a fraction having at least one peak molecular weight in the range of from 10,000 to 60,000, preferably from 10,000 to 50,000, in a chromatogram (second chromatogram) taken by GPC with respect to both terminal vinyl aromatic hydrocarbon polymer blocks (S), and a fraction having at least one peak molecular weight in the range of from 120,000 to 250,000, preferably from 150,000 to 250,000, in the second chromatogram. The peak molecular weights of both terminal vinyl aromatic hydrocarbon polymer blocks can be controlled by varying the amount of a catalyst used in the production of both terminal vinyl aromatic hydrocarbon polymer blocks (S), the amount of the vinyl aromatic hydrocarbon added in the course of the polymerization reaction for the terminal vinyl aromatic hydrocarbon polymer blocks (S), and the like. When the peak molecular weight of the fraction on the side of the low molecular weight is less than 10,000 or more than 60,000, or when the peak molecular weight of the fraction on the side of the high molecular weight is less than 120,000 or more than 250,000, the impact resistance of the linear block copolymer is disadvantageously lowered. The method for determining the peak molecular weight of both terminal vinyl aromatic hydrocarbon polymer blocks will be described below.

In the linear block copolymer of the present invention, the total amount of vinyl aromatic hydrocarbon monomer units and the total amount of conjugated diene monomer units are, respectively, from 65 to 90% by weight and from 35 to 10% by weight, based on the weight of the linear block copolymer. It is preferred that the total amount of vinyl aromatic hydrocarbon monomer units in the linear block copolymer and the total amount of conjugated diene monomer units in the linear block copolymer are, respectively, from 70 to 85% by weight and from 30 to 15% by weight, based on the weight of the linear block copolymer. When the total amount of vinyl aromatic hydrocarbon monomer units in the linear block copolymer and the total amount of conjugated diene monomer units in the linear block copolymer are, respectively, less than 65% by weight and more than 35% by weight, based on the weight of the linear block copolymer, the rigidity of the linear block copolymer is disadvantageously lowered. On the other hand, when the total amount of vinyl aromatic hydrocarbon monomer units in the linear block copolymer and the total amount of conjugated diene monomer units in the linear block copolymer are, respectively, more than 90% by weight and less than 10% by weight, based on the weight of the linear block copolymer, the impact resistance of the linear block copolymer is disadvantageously lowered.

Examples of vinyl aromatic hydrocarbon monomers used in the present invention include styrene, o-methylstyrene, p-methylstyrene, p-tert-butylstyrene, 1,3-dimethylstyrene, $\alpha$-methylstyrene, vinylnaphthalene, vinylanthracene and 1,1-diphenylethylene. Of these, styrene is especially preferred. These vinyl aromatic hydrocarbon monomers can be used individually or in combination. In the present invention, a conjugated diene means a diolefin having a pair of conjugated double bonds. Examples of conjugated dienes used in the present invention include 1,3-butadiene, 2-methyl-1,3-butadiene (isoprene), 2,3-dimethyl-1,3-butadiene, 1,3-pentadiene and 1,3-hexadiene. Of these, 1,3-butadiene and isoprene are especially preferred. These conjugated dienes can be used individually or in combination.

It is preferred that the linear block copolymer of the present invention has a vinyl aromatic hydrocarbon polymer block ratio (hereinafter, frequently referred to simply as an "S block ratio") of from 60 to 95% by weight, more advantageously from 65 to 90% by weight, wherein the S block ratio is defined as the percent by weight of the vinyl aromatic hydrocarbon monomers contained in polymer blocks (S), based on the total weight of all vinyl aromatic hydrocarbon monomers contained in the linear block copolymer. In the present invention, the S block ratio is obtained as follows. The linear block copolymer is subjected to oxidative degradation (of the conjugated diene components) using t-butyl hydroperoxide in the presence of osmium tetraoxide as a catalyst to obtain the vinyl aromatic hydrocarbon polymer block components (except those having an average degree of polymerization of about 30 or less), and the ratio of the weight of the vinyl aromatic hydrocarbon polymer block components to the total weight of all vinyl aromatic hydrocarbon monomers contained in the linear block copolymer is obtained in terms of the percent by weight (see the method described in I. M. Kolthoff et al., J. Polym. Sci. vol. 1, No. 5, pp. 429–433, 1946).

In the linear block copolymer of the present invention, the block ratio can be controlled by varying the weights of vinyl aromatic hydrocarbon monomers and conjugated diene monomers contained in vinyl aromatic hydrocarbon/conjugated diene copolymer blocks (B/S), the weight ratio thereof, the polymerization reactivity ratio thereof, and the like. Illustratively stated, the block ratio can be controlled by a method which comprises polymerizing vinyl aromatic hydrocarbon monomers and conjugated diene monomers while continuously adding a mixture thereof to the polymerization reaction system, or by a method which comprises copolymerizing vinyl aromatic hydrocarbon monomers and conjugated diene monomers using a polar compound which acts as a randomizing agent. These methods can be employed individually or in combination.

Examples of polar compounds used as a randomizing agent in the present invention include ethers, such as tetrahydrofuran, diethylene glycol dimethyl ether and diethylene glycol dibutyl ether; amines, such as triethylamine and tetramethylethylenediamine; thioethers; phosphines; phosphoramides; alkylbenzenesulfonates; and potassium and sodium alkoxides.

The peak molecular weights of both terminal vinyl aromatic hydrocarbon polymer blocks of the linear block copolymer of the present invention can be determined by substantially the same method as employed for determining the peak molecular weight of the linear block copolymer mentioned above, that is, the method which comprises subjecting to GPC the above-mentioned vinyl aromatic hydrocarbon polymer block components which have been obtained, in the measurement of the S block ratio, by the oxidative degradation of the linear block copolymer.

The linear block copolymer of the present invention has a weight average molecular weight of from 50,000 to 500,000. The weight average molecular weight of the linear block copolymer can be determined by GPC using standard polystyrene samples.

From the viewpoint of the processability by molding, it is preferred that the melt flow rate (MFR) of the linear block copolymer of the present invention is from 0.1 to 50 g/10 min, more advantageously from 1 to 20 g/10 min, wherein the MFR is measured in accordance with JISK-6870 under condition G (temperature: 200° C., load: 5 kg).

The linear block copolymer of the present invention can be produced by conventional methods, such as a method described in U.S. Pat. No. 4,939,208, which comprise successively polymerizing vinyl aromatic hydrocarbon monomers and/or conjugated diene monomers in a hydrocarbon solvent in the presence of an organolithium compound as a polymerization initiator so that a linear block copolymer having the above-mentioned block configuration can be obtained. As a representative example of such methods, there can be mentioned a method for producing a linear block copolymer in a hydrocarbon solvent in the presence of an organolithium compound as a polymerization initiator, which comprises the steps: (1) initiating the polymerization of vinyl aromatic hydrocarbon monomers in a polymerization reaction system to produce vinyl aromatic hydrocarbon polymer block ($S_1$); (2) after the production of $S_1$ block, feeding conjugated diene monomers to the reaction system to produce conjugated diene polymer block ($B_1$) which is bonded directly to $S_1$ block; (3) after the production of $B_1$ block, continuously feeding a mixture of vinyl aromatic hydrocarbon monomers and conjugated diene monomers to the reaction system to produce vinyl aromatic hydrocarbon/conjugated diene copolymer block (B/S) which is bonded directly to $B_1$ block; (4) after the production of B/S block, feeding conjugated diene monomers to the reaction system to produce conjugated diene polymer block ($B_2$) which is bonded directly to B/S block; (5) after the production of $B_2$ block, feeding vinyl aromatic hydrocarbon monomers to the reaction system to produce vinyl aromatic hydrocarbon polymer block ($S_2$) which is bonded directly to $B_2$ block; and (6) after the polymerization of the vinyl aromatic hydrocarbon monomers in step (5) above, adding a deactivating agent to the reaction system to deactivate the organolithium compound, thereby producing a linear block copolymer. In the production of the linear block copolymer, it is preferred that the polymerization reactions are performed at a temperature of from −20 to 150° C. under a pressure sufficient to maintain the polymerization reaction system in a liquid state. (In the above, the suffixes attached to the symbols "S" and "B" respectively represent the block identification numbers of vinyl aromatic hydrocarbon polymer blocks (S) and conjugated diene polymer blocks (B) in the linear block copolymer.)

With respect to the method for producing the linear block copolymer of the present invention, which has a bimodal or a multimodal molecular weight distribution, There can be mentioned methods which are obtained by modifying the above-mentioned method. Examples of such methods include a method in which the polymerization initiator and vinyl aromatic hydrocarbon monomers are further added to the reaction system in the course of step (1) of the above-mentioned method to generate fresh polymerization initiating points for forming fresh additional molecular chains of linear block copolymer, thereby producing a plurality of fractions having different peak molecular weights, and a method in which a deactivating agent, such as an alcohol or water, is added to the reaction system in the course of step (5) of the above-mentioned method to deactivate a part of the polymerization initiator (the organolithium compound), thereby terminating the polymerization reaction of a part of molecular chains, followed by further adding vinyl aromatic hydrocarbon monomers to the reaction system to continue the polymerization reaction of the remaining part of molecular chains for forming fresh additional blocks of linear block copolymer, thereby producing a plurality of fractions having different peak molecular weights. These methods can be employed individually or in combination. By the above-mentioned method, fractions having different peak molecular weights can be obtained in a single reaction system. The linear block copolymer of the present invention, which has a bimodal or multimodal molecular weight distribution, can also be obtained, for example, by a method in which linear block copolymers having different peak molecular weights are separately produced by the above-mentioned method or the like, and these linear block copolymers are mixed together.

Examples of hydrocarbon solvents used for producing the linear block copolymer of the present invention include aliphatic hydrocarbons, such as butane, pentane, hexane, isopentane, heptane, octane and isooctane; alicyclic hydrocarbons, such as cyclopentane, methylcyclopentane, cyclohexane, methylcyclohexane and ethylcyclohaxane; and aromatic hydrocarbons, such as benzene, toluene, ethylbenzene and xylene.

The resin composition of the present invention can be produced by blending a styrene-containing resin in an amount of from 30 to 400 parts by weight, preferably from 50 to 300 parts by weight, with 100 parts by weight of the above-mentioned linear block copolymer. When the amount of the styrene-containing resin is less than 30 parts by weight, relative to 100 parts by weight of the linear block copolymer, the rigidity of the resin composition is unsatisfactory. When the amount of the styrene-containing resin is more than 400 parts by weight, relative to 100 parts by weight of the linear block copolymer, the impact resistance of the resin composition is disadvantageously lowered.

As a styrene-containing resin used in the present invention, there can be mentioned a non-rubber-modified, styrene-containing polymer. A rubber-modified polystyrene may also be used as long as the resin composition retains transparency. Examples of non-rubber-modified styrene-containing polymers include polystyrene, a styrene-α-methylstyrene copolymer, an acrylonitrilestyrene copolymer, a styrene-(meth)acrylate copolymer and a styrene-maleic anhydride copolymer. Of these, polystyrene and a styrene-n-butyl acrylate copolymer are especially preferred. These polymers can be used individually or in combination.

The resin composition of the present invention can be produced by any conventional method. Examples of such methods include a melt-kneading method using a mixing machine generally used in the art, such as an open roll, an intensive mixer, an internal mixer, Kokneader, a continuous kneader having a twin-rotor, or an extruder, and a method which comprises dissolving or dispersing each component in a solvent and removing the solvent from the resultant mixture by heating.

If desired, any additive can be added to the linear block copolymer of the present invention and the resin composition containing the same. With respect to the type of additive and the amount of the additive, there is no particular limitation as long as an additive conventionally used for preparing a plastic is used in an amount conventionally used. Examples of additives include inorganic reinforcing agents, such as glass fiber, glass bead, silica, calcium carbonate and talc; organic reinforcing agents, such as organic fiber, a coumarone-indene resin; crosslinking agents, such as an organic peroxide and an inorganic peroxide; pigments, such as titanium white, carbon black and iron oxide; dyes; flame retardants; antioxidants; ultraviolet light absorbers; antistatic agents; lubricants; plasticizers; other bulk fillers; and mixtures thereof.

The linear block copolymer of the present invention and the resin composition containing the same can be molded by substantially the same molding method as employed in the molding of an ordinary thermoplastic resin, wherein the linear block copolymer and/or the resin composition may be subjected to coloring treatment. By such a molding method, a shaped article for use in various application fields can be produced. For example, a shaped article produced by a molding method, such as injection molding or blow molding, can be used as a container for parts of office automation apparatuses, daily necessities, food, miscellaneous commodities, parts of light electrical appliances and the like. Further, a shaped article (such as a sheet or a film) produced by extrusion molding is commercially very useful. When such an extruded product is further subjected to deep draw forming, such as vacuum forming or pressure forming, a shaped article can be produced which can be advantageously used in various application fields, such as a container for food and a container for vegetables and fruits or confectionery.

BEST MODE FOR CARRYING OUT THE INVENTION

Hereinbelow, the present invention will be described in more detail with reference to the following Examples and Comparative Examples, which should not be construed as limiting the scope of the present invention.

In the Examples and Comparative Examples, the measurement, analysis and evaluation were conducted by the following methods.

(1) Melt flow rate (MFR)

The MFR (g/10 min) is measured in accordance with JIS K-6870 under condition G (temperature: 200° C., load: 5 kg).

(2) Peak molecular weights and weight average molecular weight of a linear block copolymer, and contents of fractions in the linear block copolymer 10 mg of a linear block copolymer is dissolved in 10 mg of tetrahydrofuran (THF) to prepare a solution. The prepared solution is subjected to GPC to obtain a GPC chromatogram. From the obtained GPC chromatogram, the peak molecular weights of fractions in the linear block copolymer are determined using a calibration curve obtained with respect to monodisperse polystyrene samples. The contents (% by weight) of fractions in the linear block copolymer are determined from the area ratios of fractions in the GPC chromatogram. Further, the weight average molecular weight of the linear block copolymer is determined. The conditions for GPC analysis conducted above are as follows.

Column: Polystyrene gel

Column temperature: 42° C.

Solvent: THF

Flow rate: 2 ml/min

Detector: RI (3) S block ratio 30 to 50 mg of a linear block copolymer is accurately weighed and added to about 10 ml of chloroform. To the resultant mixture are added osmium tetraoxide and t-butyl hydroperoxide, followed by boiling at 100° C. for 20 minutes. To the resultant mixture is added 200 ml of methanol to precipitate decomposed products. The obtained precipitate is filtered off using a glass filter (11G4, capacity: 11 ml, maximum pore size: 5 to 10 μm) to obtain a filtration residue (block styrenes). The obtained filtration residue is weighed. The S block ratio (% by weight) is calculated from the following formula.

S block ratio (% by weight)={(the weight (mg) of the filtration residue (block styrene))/(the total weight (mg) of all styrene monomers in the linear block copolymer)}×100

(4) Peak molecular weight of a styrene block

The peak molecular weights of fractions in styrene polymer blocks are determined in substantially the same manner as in item (2) above except that, instead of 10 mg of the linear block copolymer of item (2) above, the filtration residue (block styrenes) obtained in item (3) above is dissolved in THF.

(5) Rigidity

The modulus in tension (kg/cm$^2$) of a sheet produced from a linear block copolymer by molding is measured in the machine direction (MD) (in an extrusion direction of the sheet) and in the transverse direction (TD) (in a direction perpendicular to the extrusion direction of the sheet) in accordance with JIS K-6872. The average value of the two values obtained with respect to the MD and the TD is used as an index for the rigidity of the sheet.

(6) Transparency

The surface of a sheet is coated with liquid paraffin and the haze (%) of the sheet is measured in accordance with ASTM D1003. The smaller the value of the haze of the sheet, the higher the transparency of the sheet.

(7) Impact resistance

Pressure forming of a sheet is conducted using a pressure forming machine (VPF3030, manufactured and sold by United Mold, Japan) to produce a cup having an opening diameter of 8 cm, a bottom diameter of 5 cm and a height of 11 cm. Holding the produced cup around its periphery just below the opening (mouth portion for drinking, which is formed by folding-down), the cup is crushed in a moment in the MD or the TD. The impact resistance of the sheet is evaluated by determining whether or not the cup is caused to have a crack. Six cups produced by the pressure forming are used as test samples for the evaluation of the impact resistance of the sheet; three cups of the six cups are crushed in the MD and the other three cups are crushed in the TD. The criteria for the evaluation are as follows.

○: no cup is caused to have a crack in the MD or the TD.

×: at least one cup is caused to have a crack in the MD or at least one cup is caused to have a crack in the TD.

EXAMPLE 1

The polymerization reactions for producing a linear block copolymer were successively performed as follows. A 25% by weight solution of styrene in cyclohexane, which contains 20 parts by weight of styrene, was charged into a 30-liter sealed reactor having a jacket. Into the reactor were charged 0.08 part by weight of n-butyllithium and 0.015 part by weight of tetramethylethylenediamine. The reactor was purged with nitrogen gas. Then, a first polymerization reaction was performed at 80° C. for 20 minutes while maintaining the pressure in the reactor in the range of from 3 to 5 kgf/cm$^2$G. Then, a 25% by weight solution of 1,3-butadiene in cyclohexane, which contains 8 parts by weight of 1,3-butadiene, was charged at a time into the reactor to perform a second polymerization reaction at 80° C. for 15 minutes. Then, a third polymerization reaction was performed at 80° C. while continuously charging over 30 minutes into the reactor a 25% by weight solution of 1,3-butadiene and styrene in cyclohexane, which contains 9 parts by weight of 1,3-butadiene and 15 parts by weight of styrene. Then, a 25% by weight solution of 1,3-butadiene in cyclohexane, which contains 8 parts by weight of 1,3-butadiene, was charged at a time into the reactor to perform a fourth polymerization reaction at 80° C. for 15 minutes. Then, a 25% by weight solution of styrene in cyclohexane, which contains 3 parts by weight of styrene, was charged into the reactor to perform a fifth polymerization reaction at 80° C. for 5 minutes. Thereafter, methanol was fed to the reactor in a molar amount of 0.4 times the molar amount of the n-butyllithium used, and the reactor was maintained for 5 minutes while stirring. Then, a 25% by weight solution of styrene in cyclohexane, which contains 37 parts by weight of styrene, was charged into the reactor to perform a sixth polymerization reaction at 80° C. for 25 minutes. Thereafter, in order to completely terminate the polymerization reactions, methanol was fed to the reactor in a molar amount of 0.6 times the molar amount of the n-butyllithium used, and the reactor was stirred for several minutes (1 to 5 minutes). After stirring for several minutes, 2-[1-(2-hydroxy-3,5-di-t-pentylphenyl)ethyl]-4,6-di-t-pentylphenyl acrylate as a stabilizer was charged into the reactor in an amount of 0.3 part by weight, relative to 100 parts by weight of the produced linear block copolymer. Then, the cyclohexane solvent was removed from the reactor using a double drum dryer to thereby recover the produced linear block copolymer. Various physical properties of the produced linear block copolymer were measured by the above-mentioned measuring methods. These results are shown in Table 1.

As shown in Table 1, the contents of styrene and butadiene in the produced linear block copolymer are 75% by weight and 25% by weight, respectively, and the produced linear block copolymer is a linear block copolymer having an $S_1$-$B_1$-B/S-$B_2$-$S_2$ block configuration and a bimodal molecular weight distribution.

Next, 150 parts by weight of general-purpose polystyrene (weight average molecular weight: 240,000) were blended with 100 parts by weight of the above-produced linear block copolymer to obtain a resin composition. The obtained resin composition was subjected to extrusion molding using a 40 mm sheet extruder (USV 40 mm extruder, Union Plastics, Japan) to obtain a sheet having a thickness of 1.2 mm. The rigidity, transparency and impact resistance of the obtained sheet were evaluated by the above-mentioned measuring methods. These results are also shown in Table 1.

Table 1 shows that the linear block copolymer and the resin composition comprising the linear block copolymer and a styrene-containing resin exhibit excellent rigidity, transparency and impact resistance.

EXAMPLES 2 TO 6 AND COMPARATIVE EXAMPLES 1 TO 4

Using styrene and butadiene in amounts (weight ratio) described in Table 1, polymerization reactions were successively performed in substantially the same manner as in Example 1 to produce a linear block copolymer having a block configuration described in Table 1. The contents of styrene and butadiene in the produced linear block copolymer were controlled by varying the ratio of the weight of styrene to the weight of butadiene. The peak molecular weights of the produced linear block copolymer were controlled by varying the amount of n-butyllithium (polymerization initiator) and varying the timing for the addition of methanol (deactivating agent) and the amount of methanol. The S block ratio was controlled by varying the ratio of the weight of B/S block in the linear block copolymer to the weight of the linear block copolymer, wherein when the linear block copolymer has two or more B/S blocks, the weight of B/S block means the total weight of all B/S blocks. The peak molecular weights of styrene blocks in the linear block copolymer were controlled by varying the ratio of the total weight of all S blocks in the linear block copolymer to the weight of the linear block copolymer and varying the timing for the addition of methanol (deactivating agent) and the amount of methanol.

Next, in accordance with the formulations described in Table 1, the linear block copolymer was blended with general-purpose polystyrene and styrene-n-butyl acrylate copolymer to obtain a resin composition. The obtained resin composition was subjected to extrusion molding in substantially the same manner as in Example 1 to obtain a sheet. The rigidity, transparency and impact resistance of the obtained sheet were evaluated by the above-mentioned methods. These results are shown in Table 1.

With respect to the styrene-n-butyl acrylate copolymer used in Examples 5 and 6, the content of n-butyl acrylate in the copolymer was 14% by weight, and the MFR (temperature: 200° C., load: 5 kg) of the copolymer was 2.0 g/10 min.

TABLE 1

| | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Characteristics of the structure of linear block copolymer | Block configuration | $S_1$-$B_1$-B/S-$B_2$-$S_2$ | $S_1$-$B_1$-B/S-$B_2$-$S_2$ | $S_1$-$B_1$-B/S-$B_2$-$S_2$ | $S_1$-$B_1$-B/S-$B_2$/S-$B_3$-$S_2$ | $S_1$-$B_1$-B/S-$B_2$-$S_2$ | $S_1$-$B_1$-B/S-$B_2$-$S_2$ | $S_1$-$B_1$-B/S-$B_2$-$S_2$ | $S_1$-$B_1$-B/S-$B_2$-$S_2$ | $S_1$-$B_1$-B/S-$B_2$-$S_2$ | $S_1$-$B_1$-B/S-$S_2$ |
| | Amounts of styrene and butadiene (weight ratio) | 20-8-9/15-8-40 | 19-7-8/13-7-46 | 15-12-8/13-12-40 | 20-3-5/11-2-5/11-3-40 | 20-8-9/15-8-40 | 20-8-9/15-8-40 | 20-15-10/9-15-31 | 27-9-9/14-8-34 | 15-8-9/12-8-48 | 23-13-11/13-40 |
| | Styrene content (% by weight) | 75 | 78 | 68 | 82 | 75 | 75 | 60 | 75 | 75 | 76 |
| | Butadiene content (% by weight) | 25 | 22 | 32 | 18 | 25 | 25 | 40 | 25 | 25 | 24 |
| | MFR (g/10 min) | 8 | 9 | 4 | 10 | 8 | 8 | 5 | 4 | 5 | 7 |
| | Linear block copolymer | | | | | | | | | | |
| | Fraction (α) | | | | | | | | | | |
| | Peak molecular weight ($\times 10^4$) | 9.0 | 8.5 | 7.0 | 9.6 | 9.0 | 9.0 | 7.4 | 12.2 | 14.2 | 8.3 |
| | Content (% by weight) | 45 | 40 | 42 | 60 | 45 | 45 | 50 | 35 | 100 | 52 |
| | Fraction (β) | | | | | | | | | | |
| | Peak molecular weight ($\times 10^4$) | 20.0 | 22.0 | 28.6 | 17.8 | 20.0 | 20.0 | 19.2 | 19.8 | — | 21.3 |
| | Content (% by weight) | 55 | 60 | 58 | 40 | 55 | 55 | 50 | 65 | 0 | 48 |
| | Weight average molecular weight ($\times 10^4$) | 13.1 | 13.4 | 15.6 | 12.5 | 13.1 | 13.1 | 14.2 | 13.8 | 14.0 | 12.9 |
| | S block ratio (% by weight) | 82 | 88 | 84 | 74 | 82 | 82 | 88 | 85 | 87 | 86 |
| | Styrene blocks | | | | | | | | | | |
| | ① Fraction | 2.0 | 2.1 | 1.6 | 3.2 | 2.0 | 2.0 | 3.1 | 4.1 | 2.2 | 3.8 |
| | ② Fraction | | | | | | | | | | |
| | Peak molecular weight ($\times 10^4$) | 16.0 | 18.4 | 18.1 | 14.3 | 16.0 | 16.0 | 14.6 | 10.2 | 8.2 | 15.3 |
| Weight Ratio (parts by weight) | Block copolymer | 100 | 100 | 100 | 100 | 100 | 100 | 100 | 100 | 100 | 100 |
| | General-purpose polystyrene | 150 | 100 | 200 | 60 | 0 | 70 | 150 | 150 | 150 | 150 |
| | Styrene-n-butyl acrylate copolymer | 0 | 0 | 0 | 0 | 150 | 30 | 0 | 0 | 0 | 0 |
| Physical properties | Rigidity: modulus in tension (kg/cm²) | 14,000 | 13,200 | 13,300 | 13,000 | 13,600 | 13,700 | 10,200 | 14,800 | 15,000 | 14,500 |
| | Transparency: haze (%) | 1.3 | 1.2 | 2.8 | 1.1 | 0.4 | 1.1 | 6.2 | 1.6 | 1.9 | 1.5 |
| | Impact resistance | ○ | ○ | ○ | ○ | ○ | ○ | ○ | X | X | X |

INDUSTRIAL APPLICABILITY

A shaped article obtained by molding the linear block copolymer of the present invention or by molding a resin composition which is obtained by blending the linear block copolymer with a styrene-containing resin, such as polystyrene or a styrene-n-butyl acrylate copolymer, not only exhibits excellent impact resistance and rigidity but also retains high transparency, so that such a shaped article can be advantageously used in various application fields, such as deep draw formed plastic products (e.g., a cup for frozen or cold dessert and a cup for beverage), see-through cases for food through which the contents of the cases can be clearly seen, materials for wrapping, and blisters.

What is claimed is:

1. A linear block copolymer comprising:

at least two vinyl aromatic hydrocarbon polymer blocks (S);

at least two conjugated diene polymer blocks (B); and at least one vinyl aromatic hydrocarbon/conjugated diene copolymer block (B/S), the total amount of vinyl aromatic hydrocarbon monomer units in said linear block copolymer and the total amount of conjugated diene monomer units in said linear block copolymer being, respectively, from 65 to 90% by weight and from 35 to 10% by weight, based on the weight of said linear block copolymer, said linear block copolymer having a block configuration wherein:

both terminal polymer blocks of said linear block copolymer are vinyl aromatic hydrocarbon polymer blocks (S), said both terminal vinyl aromatic hydrocarbon polymer blocks (S) have, bonded directly to the respective inner ends thereof, conjugated diene polymer blocks (B), and said conjugated diene polymer blocks (B), which are bonded directly to the respective inner ends of said both terminal vinyl hydrocarbon polymer blocks (S), have therebetween one or two vinyl aromatic hydrocarbon/conjugated diene copolymer blocks (B/S) which is or are bonded directly to the respective inner ends of the conjugated diene polymer blocks (B), wherein, when said polymer blocks (B) have therebetween two vinyl aromatic hydrocarbon/conjugated diene copolymer blocks (B/S), said two copolymer blocks (B/S) have therebetween at least one polymer block selected from the group consisting of said polymer blocks (S), (B) and (B/S) in a contiguous relationship, said linear block copolymer comprising at least two different fractions (α) and (β), wherein said fraction (α) has at least one peak molecular weight in the range of from 50,000 to 150,000 in a first chromatogram taken by gel permeation chromatography (GPC) with respect to said linear block copolymer, and said fraction (β) has at least one peak molecular weight in the range of from more than 150,000 to 350,000 in said first chromatogram, said both terminal vinyl aromatic hydrocarbon polymer blocks (S) in total comprising a fraction having at least one peak molecular weight in the range of from 10,000 to 60,000 in a second chromatogram taken by GPC with respect to said both terminal vinyl aromatic hydrocarbon polymer blocks (S), and a fraction having at least one peak molecular weight in the range of from 120,000 to 250,000 in said second chromatogram, said linear block copolymer having a weight average molecular weight of from 50,000 to 500,000.

2. The block copolymer according to claim 1, which has a block configuration represented by the following formula (1):

$$S\text{-}(B\text{-}B/S)_n\text{-}B\text{-}S \qquad (1)$$

wherein each S independently represents said vinyl aromatic hydrocarbon polymer block;

each B independently represents said conjugated diene polymer block;

the or each B/S represents said vinyl aromatic hydrocarbon/conjugated diene copolymer block; and n represents an integer of from 1 to 5.

3. The block copolymer according to claim 1 or 2, wherein said both terminal vinyl aromatic hydrocarbon polymer blocks (S) in total comprise a fraction having at least one peak molecular weight in the range of from 10,000 to 50,000 in said second chromatogram, and a fraction having at least one peak molecular weight in the range of from 150,000 to 250,000 in said second chromatogram.

4. The block copolymer according to claim 1 or 2, which has a vinyl aromatic hydrocarbon polymer block ratio of from 60 to 95% by weight, wherein said block ratio is defined as the percent by weight of the vinyl aromatic hydrocarbon monomer units contained in said polymer blocks (S), based on the total weight of vinyl aromatic hydrocarbon monomer units contained in said linear block copolymer.

5. The block copolymer according to claim 1 or 2, wherein said fraction (α) has at least one peak molecular weight in the range of from 50,000 to 120,000 in said first chromatogram, and said fraction (β) has at least one peak molecular weight in the range of from 160,000 to 300,000 in said first chromatogram.

6. The block copolymer according to claim 1 or 2, wherein the content of said fraction (α) in said linear block copolymer and the content of said fraction (β) in said linear block copolymer are from 30 to 70% by weight and from 70 to 30% by weight, respectively.

7. A resin composition comprising 100 parts by weight of the linear block copolymer of claim 1 or 2 and 30 to 400 parts by weight of a styrene-containing resin.

* * * * *